Nov. 11, 1952  W. E. ELDER  2,617,445
CAM ACTUATED SELECTOR VALVE
Filed Oct. 28, 1948  2 SHEETS—SHEET 1
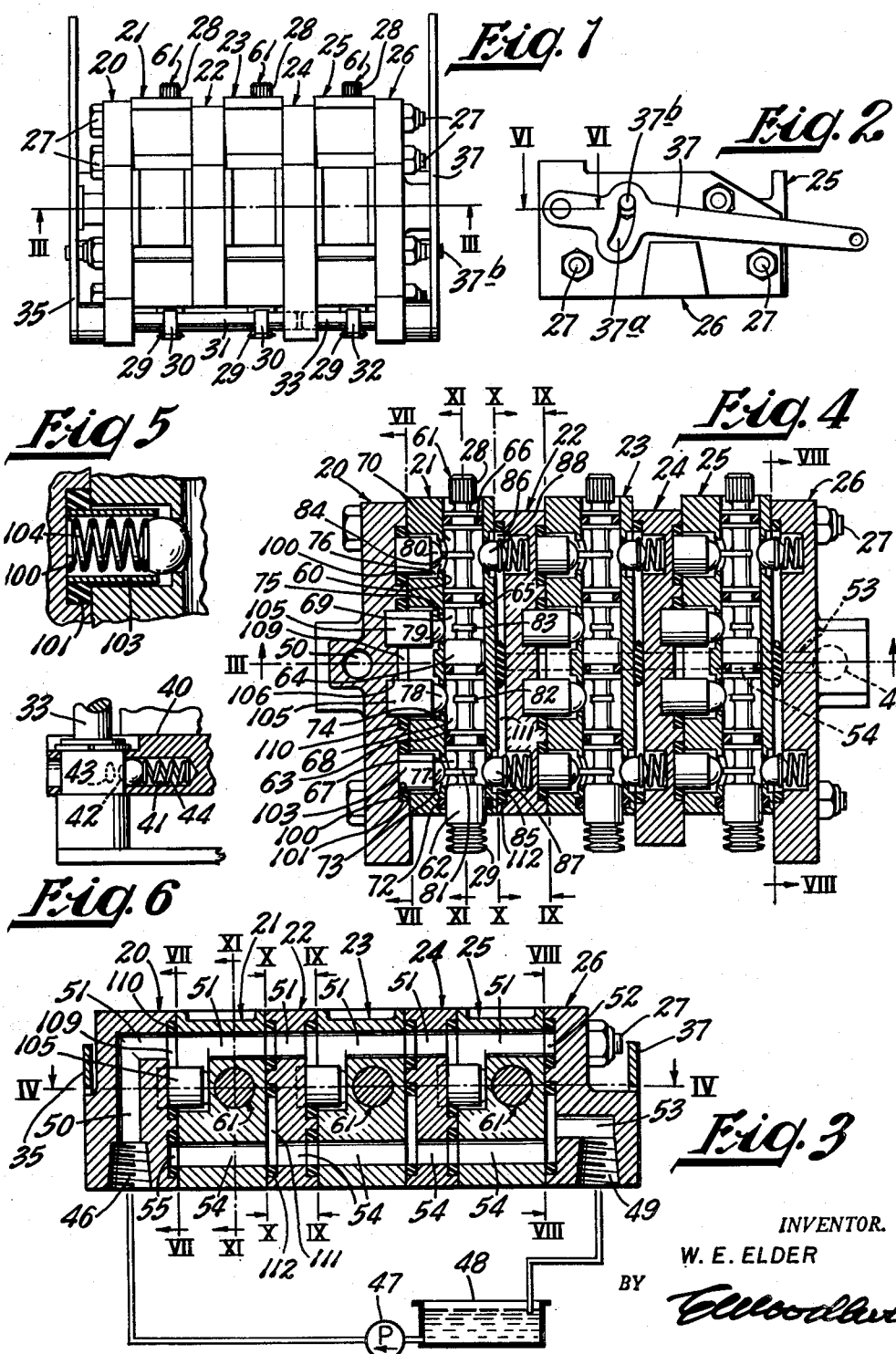
INVENTOR.
W. E. ELDER
BY
ATTORNEY Nov. 11, 1952     W. E. ELDER     2,617,445
CAM ACTUATED SELECTOR VALVE Filed Oct. 28, 1948     2 SHEETS—SHEET 2

INVENTOR.
W. E. ELDER
BY
ATTORNEY

Patented Nov. 11, 1952

2,617,445

UNITED STATES PATENT OFFICE 2,617,445

CAM ACTUATED SELECTOR VALVE

William E. Elder, Sherman Oaks, Calif., assignor to Bendix Aviation Corporation, South Bend, Ind., a corporation of Delaware Application October 28, 1948, Serial No. 57,091

7 Claims. (Cl. 137—636)

This invention relates to selector valves for the control of fluid flow in hydraulic power systems, and is particularly adapted for use in aircraft hydraulic systems where compactness and lightness are important and where it is desirable to be able to shift a valve into a predetermined emergency position in the event of failure of the normal controls.

An object of the invention is to provide a compact and light weight multiple valve unit for controlling a plurality of hydraulic circuits.

Another object is to provide a simple and effective construction for a multi-section valve unit.

Another object is to provide a practicable multiple valve having a regular mode of operation for normal selective control of fluid flow through several different paths, and an emergency mode of operation for control of fluid flow through a single predetermined path irrespective of said first mode of operation.

Other more specific objects and features of the invention will appear from the description to follow.

Briefly, the present invention resides in a multiple valve consisting of a stack of body sections having parallel faces adapted to seal with each other when clamped together, the construction being such that the assembly of the sections also completes the operative assembly of certain of the movable working parts of the valve. The body sections are composed of "valve sections," each defining a cam actuated valve unit, alternated with "spacer sections" intermediate the valve sections, and a pair of "end sections" at opposite ends of the stack. Pressure and exhaust passages extending from one end of the stack to the other are formed by alined apertures extending through all of the intermediate sections and connected to external lines at one of the end sections. Passages for supplying fluid to separate hydraulic circuits are extended directly from the valve sections. Connection between the pressure and exhaust passages and the appropriate valves in each valve section are effected by suitably shaped recesses in certain faces of the spacer sections and/or end sections, thereby minimizing the forming of special fluid passages within the valve sections. Each valve section comprises a cam shaft rotatable and longitudinally reciprocable in a bore in the valve section, the cam shaft having eccentric portions so angularly oriented with respect to each other as to selectively open predetermined valves in predetermined different angular positions. The eccentric portions of the cam shaft are of limited extent longitudinally so that by longitudinally shifting the shaft through a fixed predetermined distance, all of the eccentric portions are shifted out of operative relation with their associated valves so that the latter are free to close. However the cam shaft is provided with concentric portions adapted to open certain of the valves when the cam shaft is shifted longitudinally, irrespective of the angular position of the shaft.

Further details of the valve will become apparent from the detailed description to follow with reference to the drawing, in which:

Fig. 1 is a plan view of a three-unit multiple valve in accordance with the invention.

Fig. 2 is an end elevational view of the valve, looking at the right end of Fig. 1;

Fig. 3 is a vertical section taken in the plane III—III of Fig. 1.

Fig. 4 is a horizontal section taken in the plane IV—IV of Fig. 3.

Fig. 5 is a detail longitudinal section through one of the valve passages of the valve, showing the ball poppet thereof in seated relation.

Fig. 6 is a detail section taken in the plane VI—VI of Fig. 2, showing a detent for restraining rotation of one of the emergency rock shafts.

Figures 7, 8:
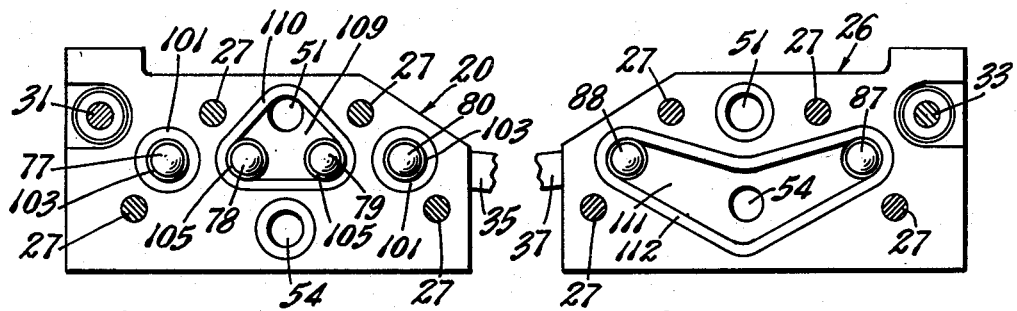
Figs. 7, 8, 9, 10, and 11 are sectional views taken in the planes VII—VII, VIII—VIII, IX—IX, X—X and XI—XI of Figs. 3 and 4.

Referring first to Fig. 1, the multiple valve therein disclosed comprises a stack of sections 20, 21, 22, 23, 24, 25 and 26 respectively which are clamped together by a plurality of bolts 27 extending through appropriate passages formed in some or all of the sections. The outer sections 20 and 26 respectively will be hereinafter referred to as end sections, and the sections 22 and 24 will be referred to as spacer sections, whereas the sections 21, 23 and 25 will be referred to as valve sections.

Each of the valve sections 21, 23 and 25 contains a bore, extending parallel to the section faces, in which a cam shaft is rotatably and reciprocably contained. Each of the cam shafts has a splined end 28 extending from one end of its associated valve section 21, 23 or 25, which splined end is adapted to be engaged by a mating splined element (not shown) for normal actuation of the valve. In practice, the mating splined elements may be rotated manually or by any suitable remote control mechanism such as an electric motor, but this actuating mechanism constitutes no part of the present invention and is therefore not disclosed. At its opposite end, each of the cam shafts has a projecting portion 29 which has concentric grooves defining a cylindrical rack, which racks are engaged by gear segments 30, 30 on a rock shaft 31, or a gear segment 32 on a rock shaft 33. The rock shaft 31 is rotatably supported in bearing apertures provided therefor in the spacer section 24 and the end section 20 and has connected to its outer end an actuating lever 35 whereby it can be rocked through a small angle. The rock shaft 33 is supported in bearing apertures in the spacer section 24 and in the end section 26 and has a lever 37 on its outer end whereby it can be rocked through a small angle.

The arc of movement of the lever 37 (Fig. 2) can be limited by providing the latter with an arcuate slot 37a into which projects a stationary pin 37b projecting from the outer surface of the end section 26. Furthermore, the rock shaft 33 may be yieldably restrained in either of its two end positions by a detent ball 40 (Fig. 6) which is positioned in a chamber 41 in the end section 26, and urged into one or the other of two detent recesses 42 and 43 in that portion of the rock shaft 33 extending through the end section 26 by a helical compression spring 44. A similar detent mechanism may be provided for the rock shaft 31.

Obviously, rocking of the lever 35 and the rock shaft 31 shifts the cylindrical racks 29—29 of valve sections 21 and 23 longitudinally, and rocking movement of the lever 37 shifts the cylindrical rack 29 of the valve section 25 longitudinally. The effects of rotating and longitudinally shifting the cam shafts will be discussed later. It should be noted at this point that because the racks 29—29—29 are cylindrical, the gear segments 30, 30 and 32 do not interfere with the rotation of the camshafts through the splined ends 28, 28, 28. Likewise, the splines 28, 28, 28 permit the application of rotational forces to the valve cams without interfering with longitudinal movement thereof in response to actuation of the levers 35 and 37.

In the particular valve disclosed, all three valve sections 21, 23 and 25 are identical, so that a detailed description of only one of them is necessary. Likewise the right face (with reference to Figs. 3 and 4 of the drawing) of the end section 20 and of the spacer sections 22 and 24 are the same, and the left faces of the spacer sections 22, 24 and the end section 26 are the same.

Referring first to Fig. 3, the end section 20 is provided with an inlet port 46 adapted to be connected to a pressure source (which is shown schematically in Fig. 3 as a pump 47 supplied from a reservoir 48) and the end section 26 is provided with an exhaust port 49 which is adapted to be connected to any suitable exhaust line (shown in Fig. 3 as a line returning to the reservoir 48). The pressure port 46 is connected by a passage 50 with a port 51 in the right face of the end section 20, which port is alined with correspondingly numbered ports in the sections 21, 22, 23, 24 and 25 and terminates in a blind port 52 in the end section 26. The exhaust port 49 in the end section 26 is communicated by a passage 53 with a port 54 in the left face thereof which is juxtaposed to and communicates with correspondingly numbered passages 54 in sections 25, 24, 23 and 21 and terminates in a blind port 55 in the end section 20. These common pressure passages 51 and 54 which extend through all of the valve sections are connected to appropriate valves in the valve sections by recesses in the faces of the end sections and spacer sections 20, 22, 24 and 26 respectively.

Referring now to Fig. 4, each of the valve sections 21, 23 and 25 is provided with a bore 60 extending therethrough from one side to the other, parallel to the mating faces of the sections, and containing a cam shaft 61 having the previously mentioned splined section 28 on one end and the previously mentioned cylindrical rack 29 on the other end. The cam shaft has concentric sections 62, 63, 64, 65 and 66 which are spaced apart and seal with the bore 60 to define therewith four fluid chambers 67, 68, 69 and 70 respectively. To effect a seal, the concentric sections 63, 64, 65 and 66 may be provided with external grooves containing packing rings as shown, and the concentric sections 62 of the cam shaft can be sealed by a packing ring 72 in an internal groove in the bore 60.

Extending from the left face of each valve section to the bore 61 are four valve passages 73, 74, 75 and 76 communicating respectively with the fluid chambers 67, 68, 69 and 70. Each of these valve passages terminates at its inner end in a passage of smaller diameter constituting a valve seat for a poppet ball 77, 78, 79 and 80 respectively, which balls are adapted to be unseated in response to rotation of the cam shaft 61 into predetermined angular positions by eccentric portions 81, 82, 83 and 84 respectively of the cam shaft when the latter is in its normal longitudinal position shown in Fig. 4.

Each valve section 21, 23 and 25 is also provided on its right side with two valve passages 85 and 86 terminating in valve seats at the inner ends and normally closed by poppet balls 87 and 88 respectively. These poppet balls 87 and 88 are juxtaposed to the eccentric portions 81 and 84 respectively of the cam shaft, which eccentric shafts are so oriented as to never be moved into operative relation to the valve balls 87 and 88, the latter functioning solely as check valves except under emergency conditions of operation to be described.

Each of the valve sections constitutes a 4-way valve for connecting either end of a hydraulic jack 89 (Fig. 11) to the pressure fluid supply and connecting the other end to the exhaust line. To this end, each of the valve sections 21, 23 and 25 is provided with a pair of cylinder ports 90 and 91 respectively for connection to lines 92 and 93 respectively leading to the motor or jack to be actuated. Within the valve section 21, the port 90 is permanently communicated by a passage 94 with the valve passage 73, and by a passage 95 with the fluid chamber 68. The cylinder port 91 is similarly connected by a passage 96 with the fluid chamber 69, and by a passage 97 with the valve passage 76. Furthermore, the valve passages 74 and 75 are connected to the pressure fluid supply in a manner to be subsequently explained, and the passages 85 and 86 (Fig. 4) are connected to the exhaust line.

Figure 11:
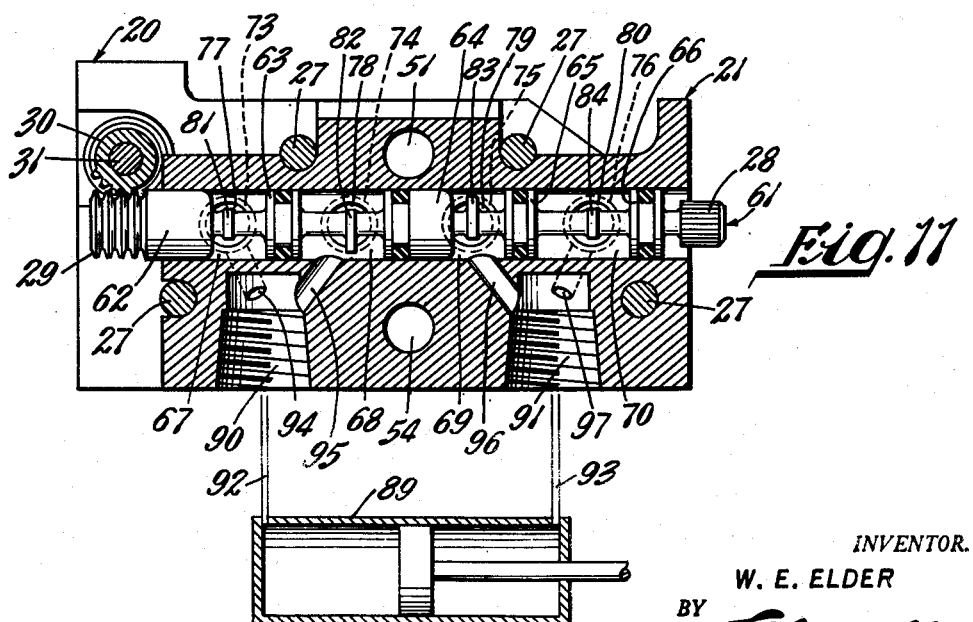

Since the valve passages (Fig. 4) 73 and 76 are connected only to the cylinder ports 90 and 91 in the manner previously described with reference to Fig. 11, these passages are blind at their juncture with the right face of the end section 20. Hence, the end plate 20 is provided opposite the passages 73 and 76 with shallow recesses 100 of slightly larger diameter than the valve passages, and each contains a gasket 101 of resilient material, such as rubber, to effect a seal at the mating surfaces of the two sections. This gasket 101 also functions to retain in position a valve guide 103 (Fig. 5) which valve guide consists of a cylindrical sleeve of slightly larger internal diameter than the valve ball. A helical compression spring 104 is positioned within each valve guide and is compressed between its related poppet ball and the end section 20. Similar valve guides 105 are provided for the valve balls 78 and 79, but for reasons that will appear later, these guides cannot be retained by gaskets as are the valve guides 103, and hence they are pressed into circular recesses 106 provided specifically for that purpose in the section 20.

As has been previously indicated, the valve passages 74 and 75 are connected to the pressure supply passage 51. This connection is effected by providing a recess 109 of triangular shape in the right end of the section 20, as shown in Fig. 7. A triangular gasket 110 is provided in this recess 109 to effect a seal between the mating faces and to restrict fluid connection by the recess 109 between the fluid pressure passage 51 and the two valve passages 74 and 75.

Figures 9, 10:
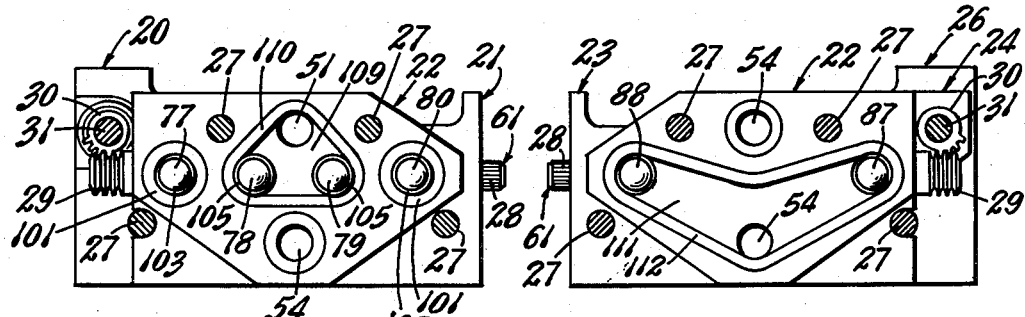

It has been previously indicated that the passages 85 and 86 (Fig. 4) are exhaust passages, the ball valves 87 and 88 normally functioning merely as check valves. Hence these passages 85 and 86 are connected to the exhaust passage 54 (Figs. 3 and 10) by a recess 111 in the left face of the spacer section 22, the edge of recess 111 being sealed by a gasket 112.

The check valves 87 and 88 are desirable to prevent surges in the exhaust passages 54 from reacting on the motors or jacks supplied by the valves. Such surges may occur because of the fact that the common exhaust passage 54 supplies a plurality of valves.

The valve functions as follows: Figs. 4 and 11 show the cam 61 in normal or neutral position in which all of the eccentric portions of the cam shaft 81, 82, 83 and 84 are alined with the valve balls 77, 78, 79 and 80 respectively, and the cam shaft is in such angular position that the balls 77 and 80 are lifted off their seats, whereas the balls 78 and 79 are seated. This cuts off pressure fluid from both ends of the cylinder 89 (Fig. 11) but leaves both ends of the cylinder connected to the fluid chambers 67 and 70 respectively so that any increase in pressure due to temperature changes or the like can be vented past the check ball 87 or 88 to the exhaust line.

By rotating the cam shaft 61 through a predetermined angle in one direction, the eccentric portion 81 permits the valve ball 77 to seat, the eccentric portion 82 opens the valve ball 78, and the eccentric portion 84 still retains the valve ball 80 off its seat. In this position, pressure fluid can flow from the pressure passage 51 through the triangular recess 109 and through the valve passage 74 into the fluid chamber 68 and thence (Fig. 11) through the passage 95 and from the port 90 to one end of the jack 89, causing the piston in the latter to move to the right. At the same time fluid in the right end of the cylinder is exhausted into the valve port 91 through the passage 97 to the valve passage 76 and thence (Fig. 4) through the chamber 70 past the check ball 88 into the recess 111 and (Fig. 10) into the exhaust passage 54.

If the cam shaft 61 is rotated out of neutral position in the opposite direction, the fluid flow to the respective ends of the jack is reversed, the eccentric portion 81 maintaining the valve ball 77 open, and the eccentric portion 83 opening the valve ball 79, whereas the eccentric portions 82 and 84 are so shaped as to permit the balls 78 and 80 to close in this position. Check ball 87 then functions to pass exhaust fluid into the exhaust recess 111, while pressure fluid is supplied from the recess 109 through the valve passage 75, the chamber 69, and the passage 96 (Fig. 11) to the cylinder port 91.

In the particular valve shown, it is desired that if an emergency disables the mechanism for rotating the cam shaft, the cam shaft be actuated by other means to open the valve ball 77 and the valve ball 79 while leaving the valve balls 78 and 80 closed, so as to actuate the jack (Fig. 11) into a predetermined position irrespective of the angular portion that the cam shaft 51 may happen to be left in. This result is achieved by making the cam shaft longitudinally reciprocable, as previously described, and so positioning the concentric portions 62 and 64 of the cam shaft that when the latter is reciprocated upwardly (with reference to Fig. 4) they unseat the valve balls 77 and 79. At the same time, all of the eccentric portions of the cam shaft are carried clear of their related valve balls so that they are ineffective in opening them, regardless of the angular position the cam shaft may happen to be in.

Although for the purpose of explaining the invention, a particular embodiment thereof has been shown and described, obvious modifications will occur to a person skilled in the art, and I do not desire to be limited to the exact details shown and described.

I claim:

1. A multiple valve comprising: a plurality of body sections having parallel mating faces and having alined apertures forming continuous fluid passages when said sections are secured together; means securing said sections together in fluid sealing relation, at least one of said sections constituting a valve section having a bore therein extending approximately parallel to said faces; a cam shaft in said bore having concentric portions sealing with said bore and defining separate fluid chambers therein, and having eccentric portions in said separate fluid chambers; said one section having a separate valve passage extending from each of said fluid chambers to a mating face, and valve seats at the chamber ends of said valve passages; poppet valves in said valve passages adapted to be unseated by said eccentric portions of said cam shaft in response to rotation thereof into predetermined angular positions; and spring means for urging the poppet valves against their seats.

2. A multiple valve according to claim 1 including a poppet guide in one of said passages and means in said next adjacent body section for supporting said guide in said valve passage.

3. A multiple valve according to claim 2 in which said next adjacent body section has a circular recess of larger diameter than said guide into which said guide projects, and a resilient sealing ring in said recess surrounding said guide and compressed between the guide, the peripheral and bottom walls of the recess and the face of said one section.

4. A multiple valve according to claim 1 in which: said cam shaft has five of said concentric portions defining first, second, third and fourth fluid chambers and respectively associated first, second, third and fourth valve passages; one of said continuous fluid passages constituting a pressure fluid passage connected to said second and third valve passages, a first cylinder port in said valve section connected to said valve passage and to said second chamber, a second cylinder port connected to said fourth valve passage and to said third chamber, and another of said continuous fluid passages constituting an exhaust fluid passage connected to said first and fourth chambers; said eccentric portions of said cam shaft being so oriented with respect to each other as to open said first and third valves in one angular position of the cam shaft and open said second and fourth valves in another angular position of the shaft; means for shifting said cam shaft longitudinally to carry all said eccentric portions thereof out of operative relation with said valves; certain of said concentric portions of said shaft being so positioned longitudinally relative to said eccentric portions as to engage and open said first and third valves in said longitudinally shifted position of said shaft irrespective of the angular position of the shaft.

5. A multiple valve according to claim 1 including a plurality of said valve sections alternated with spacer sections and end sections, each pair of adjacent faces of a valve section and the adjacent spacer or end section defining a connecting passage extending from one of said alined passages to one of said valve passages.

6. A multiple valve according to claim 1, in which said spring means is positioned in said valve passages and compressed between the poppet valves therein and the next adjacent body section.

7. A valve comprising: a body section having a bore therein; a cam shaft in said bore having a plurality of concentric portions sealing with said bore and defining a plurality of separate fluid chambers therein, and having eccentric portions in said separate fluid chambers; said body having a separate valve passage extending from each of said fluid chambers, and valve seats at the chamber ends of said valve passages; poppet valves in said valve passages adapted to be unseated by said eccentric portions of said cam shaft in response to rotation thereof into predetermined angular positions; said eccentric portions of said cam shaft being so oriented with respect to each other as to open certain of said valves in one angular position of the cam shaft, and open certain other valves in another angular position of said shaft; means for shifting said cam shaft longitudinally to carry all of said eccentric portions thereof out of operative relation with said valves; certain of said concentric portions of said shaft being so positioned longitudinally relative to said eccentric portions as to engage and open certain of said valves in said longitudinally shifted position of said shaft irrespective of the angular position of the shaft.

WILLIAM E. ELDER.

REFERENCES CITED

The following references are of record in the file of this patent:

UNITED STATES PATENTS

| Number | Name | Date |
|---|---|---|
| 1,652,845 | Vennum | Dec. 13, 1927 |
| 2,247,140 | Twyman | June 24, 1941 |
| 2,275,963 | Herman | Mar. 10, 1942 |
| 2,282,490 | Martin | May 12, 1942 |
| 2,294,702 | Van DerWerff | Sept. 1, 1942 |
| 2,299,719 | Frimel | Oct. 20, 1942 |